UNITED STATES PATENT OFFICE.

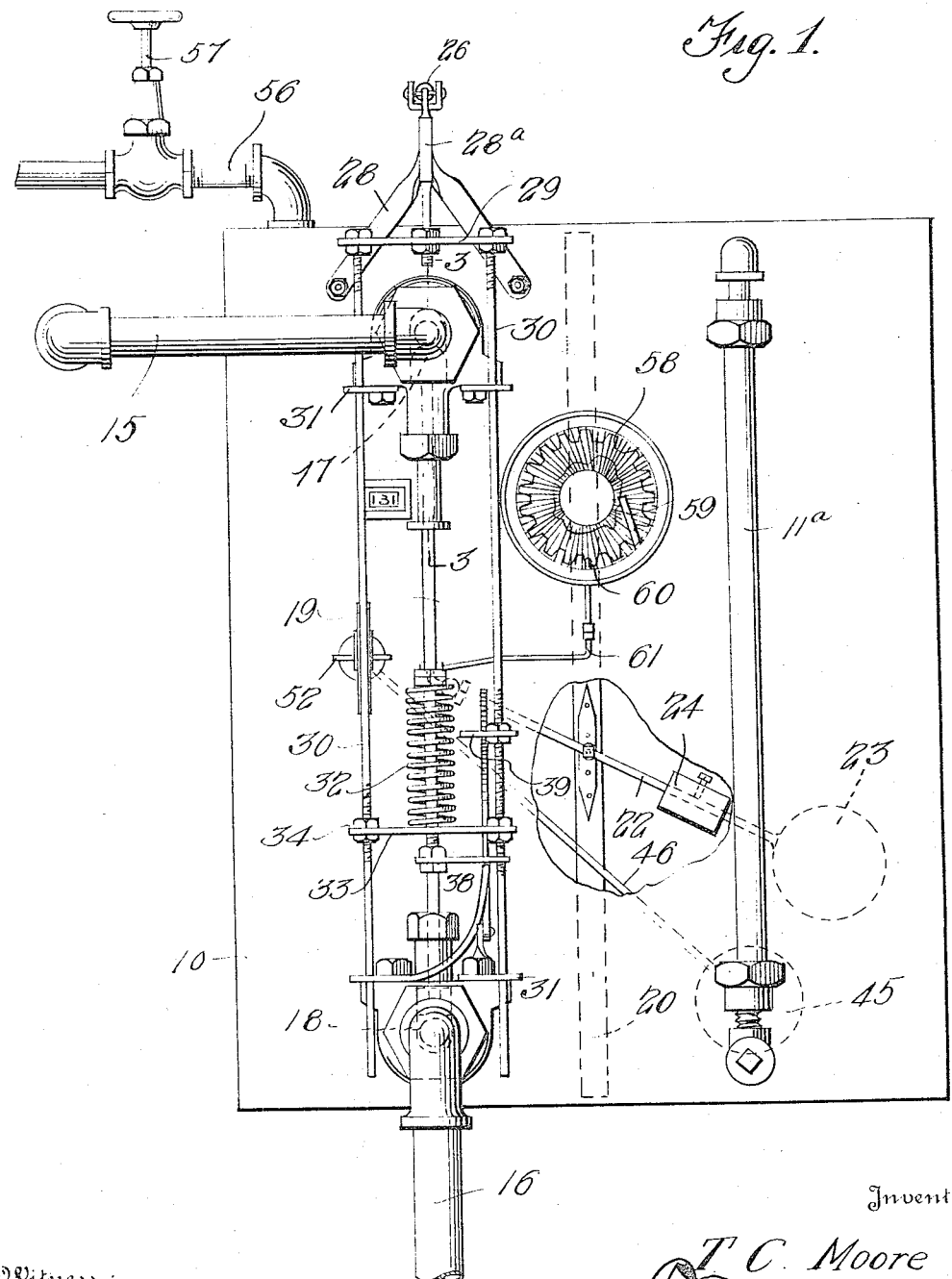

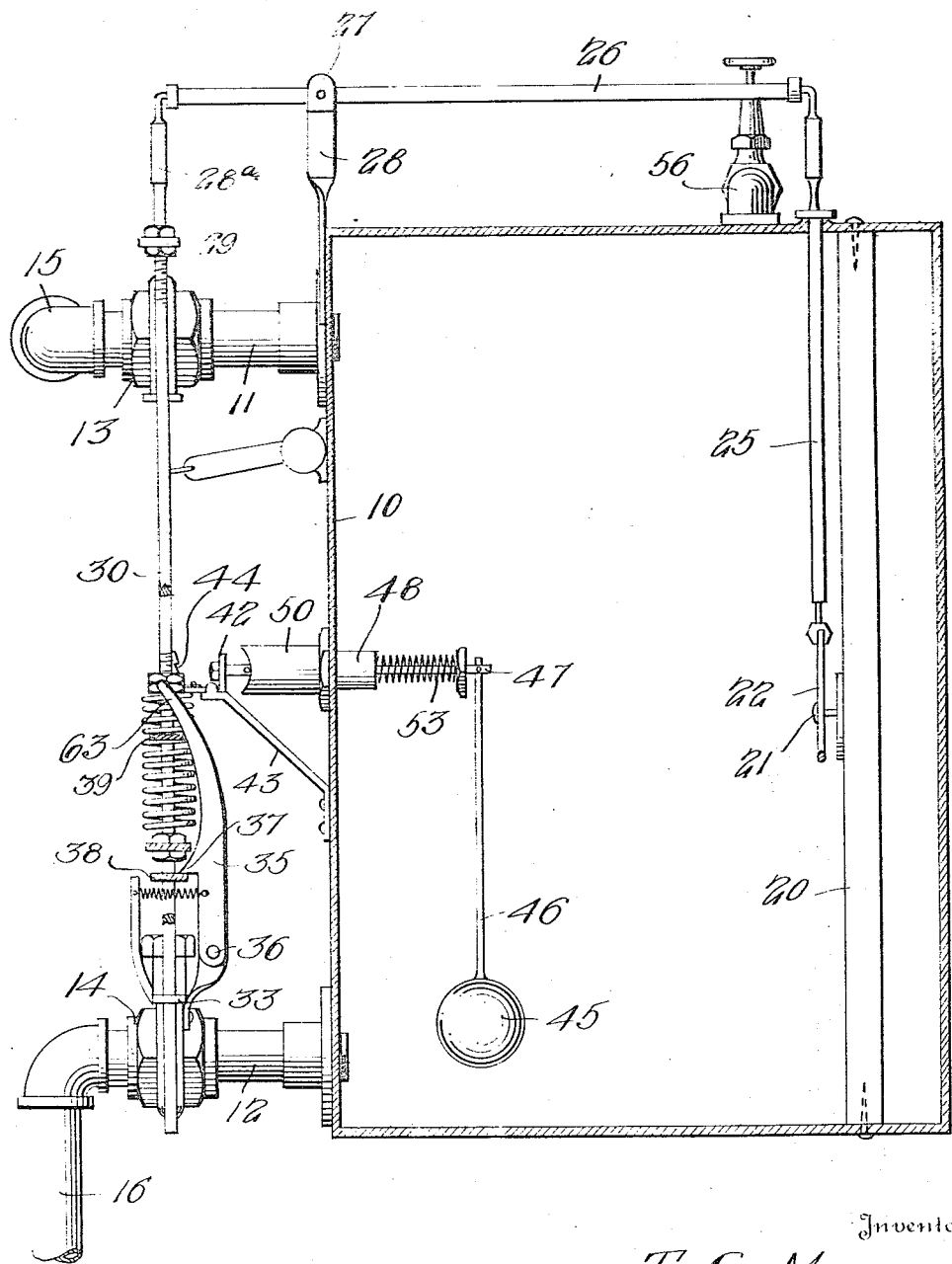

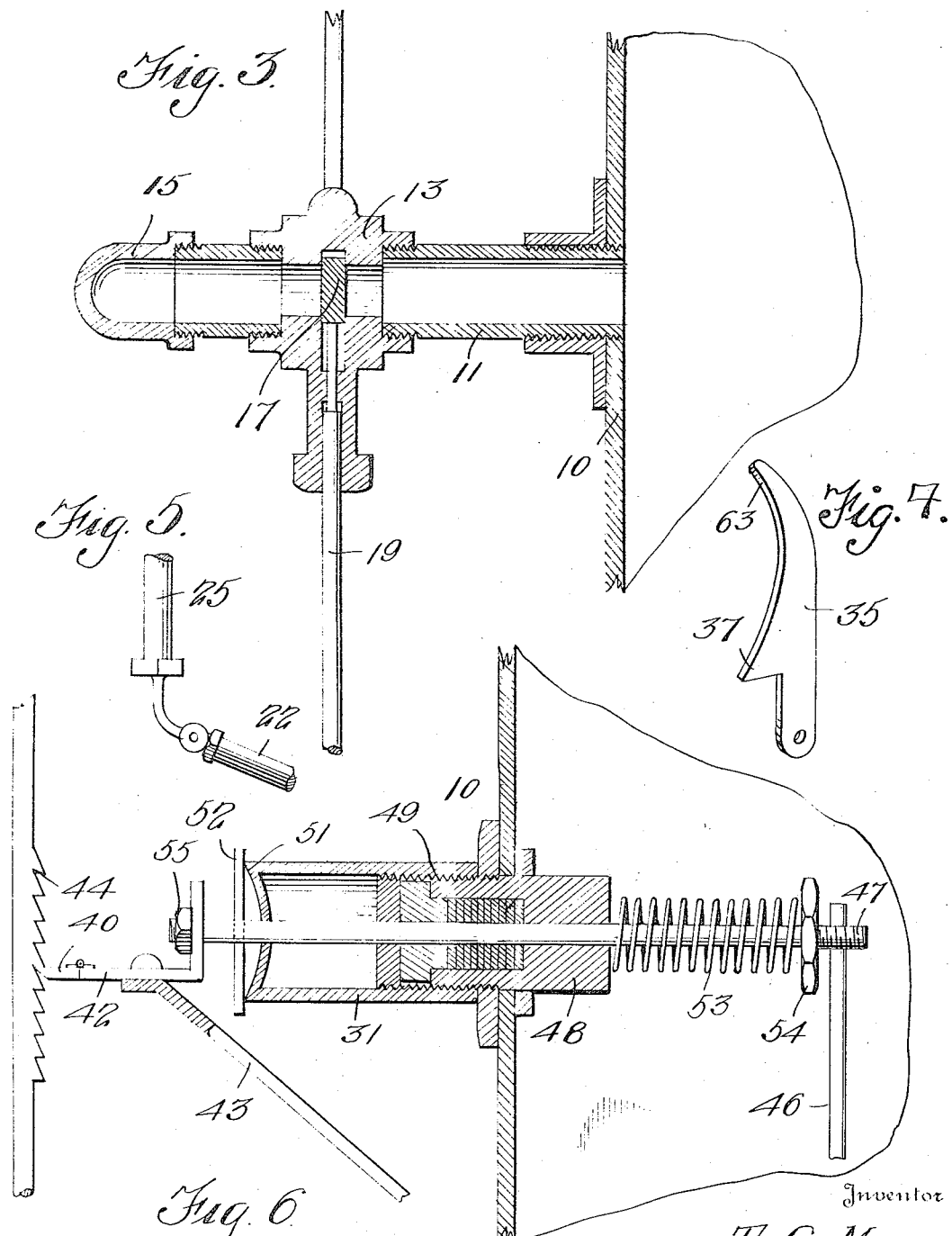

THOMAS C. MOORE, OF TAFT, CALIFORNIA.

LIQUID-METER.

1,271,351.	Specification of Letters Patent.	Patented July 2, 1918.

Application filed April 14, 1917. Serial No. 162,219.

*To all whom it may concern:*

Be it known that I, THOMAS C. MOORE, a citizen of the United States, residing at Taft, in the county of Kern and State of California, have invented certain new and useful Improvements in Liquid-Meters; and I do hereby declare the following to be a full, clear, and exact description of the invention, such as will enable others skilled in the art to which it appertains to make and use the same.

This invention has for its object to provide a device associated with a tank having a predetermined capacity for controlling passage of liquid to and from the tank and for recording each operation of the controlling means, whereby the quantity of liquid passing through the tank may be readily ascertained.

Another object of the invention is the provision of a novel construction of float operated valves and means associated therewith for locking the valves in open and closed position.

With these and other objects in view, the invention consists in the novel construction, combination and arrangement of parts as will be hereinafter specifically described, claimed and illustrated in the accompanying drawings, in which:

Figure 1 represents a front elevation, partly broken away of the invention,

Fig. 2 represents a vertical sectional view at right angles to Fig. 1,

Fig. 3 represents an enlarged detail sectional view on the line 3—3 of Fig. 1,

Fig. 4 represents a perspective view of the pivoted latch removed,

Fig. 5 represents a fragmentary detail view through the pivotal connection between several of the links of the device, and Fig. 6 represents a vertical sectional view in the plane of Fig. 2 on an enlarged scale, showing the float actuated pawl in detail.

Referring to the drawing in detail, wherein similar reference numerals designate corresponding parts throughout the several views, the numeral 10 indicates a closed tank of any preferred construction provided with a well known type of sight glass tube 11ª, whereby the liquid contents of the tank may be readily ascertained.

The front wall of the tank 10 is provided adjacent the top and bottom with inlet and exhaust ports which communicate, respectively, with inlet and outlet pipes 11 and 12, the inlet pipe 11 being connected with a valve casing 13 and the outlet pipe 12 having connection with an outlet valve casing 14. The inlet valve casing is connected with a liquid supply pipe 15, whereby liquid is conducted to the tank and the outlet valve casing 14 is connected with an outlet pipe 16, whereby the liquid emptying from the tank is conducted to any desired point exteriorly thereof. Oppositely arranged inlet and outlet valves 17 and 18 are slidably mounted in the casings 13 and 14, respectively, and the stems of the two valves are connected by a vertically movable connecting rod 19. The valves are so arranged, as will be evident by reference to Fig. 1, that as the rod 19 is moved upwardly the inlet valve 17 is closed and the outlet valve 18 is simultaneously opened, whereas during the downward movement of the connecting rod 19 the inlet valve 17 is opened and the outlet valve 18 is closed.

A supporting post 20 is arranged within the tank 10 and is pivotally connected at 21 with a lever 22, carrying the main float 23, and to which is adjustably attached a weight 24. The terminal of the lever 22 is pivotally connected with a rod or link 25, which extends upwardly through the top of the tank and is pivotally connected with the rear end of a horizontally disposed lever 26 journaled at 27 in a bearing member 28 attached to the front portion of the tank.

The front end of the lever 26 is connected by a link 28ª with a strap or plate 29 connecting the upper terminals of a pair of valve actuating rods 30 arranged in spaced parallel relation on opposite sides of the connecting rod 19. The lower terminals of the rods 30 are slidably received in a guide 31 attached to the outlet valve casing 14, and the upper portions of the rods are guided by a guide 31 connected with the inlet valve casing 13. A coil spring 32 having open or spaced convolutions is coiled about and rigidly connected at its upper terminal with the connecting rod 19 and is attached at its lower end to a plate or strap 33 secured in adjusted position longitudinally of the rods 30 by nuts 34 threaded upon the rods 30. When the rods 30 are elevated they compress the spring 32, and, when the connecting rod 19 is released by means to be hereinafter described, it is elevated by the tension of the spring so as to close the inlet valve 17 and open the outlet valve 18, whereas when the rods 30 are depressed to the limit of their downward movement, the spring 32 is extended and tensioned and when released will move the connecting rod 19 downwardly so as to open the inlet valve 17 and close the outlet valve.

In order to lock the outlet valve 18 in closed position and consequently the inlet valve 17 in open position so as to prevent gradual movement of the valves incident to the gradual upward movement of the float 23, a latch 35 is pivotally secured at 36 to an arm attached to the outlet valve casing 14 and is provided with a laterally projecting tooth 37, adapted to engage over an arm 38 rigidly secured to the connecting rod 19. The latch 35 is automatically released as the level of the liquid in the tank approaches the top thereof by an arm or finger 39 secured to the adjacent valve operating rod 30. A float actuated pawl 40 for locking the rods 30 and connecting rod 19 in elevated position so as to retain the inlet valve 17 in closed position and the outlet valve 18 in open position is hingedly connected with an angular plate 42 slidably supported on a guide 43 attached to the tank and is adapted to coöperate with downwardly directed ratchet teeth 44 formed on one of the adjacent rods 30. The pawl 40 is automatically withdrawn from the ratchet teeth 44 so as to release the rod 30 when the tank is emptied by an auxiliary float 45 attached to an arm 46 rigidly secured to a shaft 47, which latter is journaled in a plug or bushing 48 secured in the front wall of the tank 10 and is provided with a packing gland 49 to prevent liquid from escaping about the shaft. A sleeve 50 is secured to the front end of the plug or bushing 48 and is provided with a cam-shaped front edge 51 coöperating with a pin 52 secured diametrically in the shaft 47. A spring 53 is confined between the rear terminal of the plug 48 and a nut 54 secured to the shaft 47 and normally retains the latter in rearwardly extended position, engaging the pin 52 with the cam face 51 of the sleeve 50. The extreme forward end of the shaft 47 is secured to the angular terminal of the plate 42 by a nut 55, whereby during rearward movement of the shaft 47 the pivoted pawl 40 is withdrawn from engagement with the ratchet teeth 44, so as to release the rod 30 and permit the outlet valve 18 to close. An air relief pipe 56 is connected with the upper portion of the tank 10 to relieve the air pressure and vacuum therein, and is provided with a controlling valve 57.

A marker 60 is also engaged with the disk 58 and is connected by an angular rod 61 with the rod 19 connecting the inlet and outlet valves, whereby upon each operation of the valves the marker 60 is actuated and caused to produce a recording mark upon the disk 58.

In the practical operation of the liquid meter, the outlet valve 18 is retained in closed position, and the inlet valve 17 is retained in open position while the tank is filling by the tooth 37 of the latch 35 engaging the arm 38 and the connecting rod 19 connecting the two valves. As the liquid in the tank approaches the top, the float 23 is elevated effecting an upward movement of the two rods 30 through the link 25, lever 26 and link 28ª, thus engaging the arm 39 with the forwardly directed finger 63 carried by the upper terminal of the latch 35, disengaging the tooth 37 from the arm 38 and permitting the rod 19 to rise under the influence of the spring 32, which latter, it will be understood, is compressed by the upward movement of the rods 30 and plate 33. The upward movement of the rod 19 closes the inlet valve 17 and opens the outlet valve 18, thus cutting off the supply of liquid to the tank and permitting the liquid contained therein to empty through the outlet pipes 12 and 16. The valves are locked in this position during the emptying of the tank by the pivoted pawl 40, which engages the ratchet teeth 44 of the rod 30 and locks the rods, together with the rod 19, in elevated position and further prevents the float 23 from dropping. When the liquid is emptied from the tank the auxiliary float 45 is disposed in its lowermost position, as shown in Fig. 1, and during its downward movement it rotates the shaft 47, causing a gradual rearward movement thereof by engagement of the pin 52 with the cam face 51 and finally withdrawing the pawl 40 from engagement with the ratchet teeth 44 so as to release the rods 30 and permit the latter to drop under the influence of the weight of the float 23 and the weight 24 attached to the float lever 22. During the downward movement of the rods 30 the spring 32 is tensioned and automatically draws the rod 19 downward so as to open the inlet valve 17 and close the outlet valve 18 and permit the tank to be refilled, the valves being locked in this position by engagement of the arm 38 behind the tooth 37 of the pivoted latch 35.

Each vertical reciprocation of the rod 19 actuates the rod 61, effecting a corresponding vertical movement of the marker 60, which moving upon the face of the rotating disk 58 records the number of times the tank is filled and subsequently emptied and facilitating an accurate record of the quantity of liquid passing through the tank in a predetermined period.

What I claim is:

1. In combination, a tank, inlet and outlet valves for controlling the flow of fluid to and from the tank, means connecting said valves, a float-actuated lever, and resilient means connecting the lever with the connecting means to actuate the valves.

2. In combination, a tank, inlet and outlet valves for controlling the passage of fluid to and from the tank, a float-operated lever operable by the liquid contained in the tank, means connecting said valves, resilient means connecting the lever with the connecting means to actuate the valves, and means to lock the valves in adjusted position.

3. In combination, a tank, inlet and outlet valves connected therewith, resilient means connected with the valves, and float-operated means controlled by the body of liquid contained in the tank and connected with the resilient means to alternately expand and contract the latter to actuate the valves.

4. In combination, a tank, inlet and outlet valves connected therewith, means connecting the valves to effect simultaneous and opposite movement thereof, means to lock the valves in various adjusted positions, float actuated means for releasing the valves from one locked position, float actuated means controlled by the body of liquid contained in the tank for actuating the valves, and a latch member for locking the valves in another position and releasable by the last mentioned float actuated means.

5. In combination, a tank, inlet and outlet valves connected therewith, means connecting the valves to effect a simultaneous and opposite movement thereof, a float-actuated lever arranged in the tank, and means connecting said lever with the connecting means, said last-mentioned connecting means including an extensible and contractible spring adapted to be alternately extended and compressed by the float-actuated lever to adjust the valves.

6. In combination, a tank, inlet and outlet valves connected therewith, means connecting the valves to effect a simultaneous and opposite movement thereof, compressible and extensible spring means connected with the connecting means, and means controlled by the body of liquid contained in the tank to alternately extend and compress the spring means and thereby actuate the valves by the tension of the spring means.

7. In combination, a tank, inlet and outlet valves connected with the tank and arranged exteriorly thereof, float-operated means for actuating the valves, a pawl locking the valves in adjusted position and arranged interiorly of the tank, and float-operated means for withdrawing the pawl and releasing the valves.

8. In combination, a tank, inlet and outlet valves connected therewith, means connecting said valves to effect a simultaneous and opposite movement thereof, a float actuated lever arranged in the tank, means connecting said lever with the connecting means, said last-mentioned means including an extensible and contractible spring adapted to be alternately extended and compressed by the float-actuated lever to adjust the valves, and means to lock the valves in alternate positions.

9. In combination, a tank, inlet and outlet valves connected therewith, means connecting the valves to effect a simultaneous and opposite movement thereof, compressible and extensible spring means connected with the connecting means, means controlled by the body of liquid contained in the tank to alternately extend and compress the spring means, and thereby actuate the valves by the tension of the spring means, float-controlled means to lock the valves in one position, and means independent of the float controlled means to lock the valves in another position.

10. In combination, a tank, inlet and outlet pipes connected therewith, valves connected with the pipes, a float-actuated lever, means connecting the lever with the valves, a latch member for locking the valves in position, and an arm carried by the connecting means for engaging and releasing the latch.

In testimony whereof I affix my signature in presence of two witnesses.

THOMAS C. MOORE.

Witnesses:
M. E. CRIST,
W. A. POWER.